United States Patent
Kunii et al.

(10) Patent No.: US 11,336,156 B2
(45) Date of Patent: May 17, 2022

(54) POWER CONTROL UNIT

(71) Applicant: HONDA MOTOR CO., LTD., Tokyo (JP)

(72) Inventors: Hiroshi Kunii, Wako (JP); Akinari Hayashi, Wako (JP); Yusuke Yamamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 16/796,986

(22) Filed: Feb. 21, 2020

(65) Prior Publication Data

US 2020/0274424 A1    Aug. 27, 2020

(30) Foreign Application Priority Data

Feb. 26, 2019   (JP) .............................. JP2019-033239

(51) Int. Cl.
  *H02K 11/33*    (2016.01)
  *H02K 5/22*    (2006.01)

(52) U.S. Cl.
  CPC .............. *H02K 11/33* (2016.01); *H02K 5/225* (2013.01)

(58) Field of Classification Search
  CPC .......... H02K 11/33; H02K 5/225; H02K 9/19; H02K 11/30
  USPC ........................................... 310/68 R, 71, 89
  See application file for complete search history.

(56) References Cited

U.S. PATENT DOCUMENTS

| 7,886,865 | B2 * | 2/2011 | Sekine | H02K 11/33 |
| | | | | 180/444 |
| 8,482,172 | B2 * | 7/2013 | Sasaki | H02K 3/522 |
| | | | | 310/71 |
| 8,492,947 | B2 * | 7/2013 | Sasaki | H02K 3/522 |
| | | | | 310/180 |
| 2002/0046891 | A1 | 4/2002 | Honda et al. | |

(Continued)

FOREIGN PATENT DOCUMENTS

| CN | 102223121 | 10/2011 |
| CN | 102248963 | 11/2011 |

(Continued)

OTHER PUBLICATIONS

Chinese Office Action for Chinese Patent Application No. 202010105633.4 dated Dec. 29, 2021.

*Primary Examiner* — John K Kim
(74) *Attorney, Agent, or Firm* — Amin, Turocy & Watson, LLP (57) ABSTRACT

A power control unit includes a power module, a support block configured to support the power module, an upper case configured to cover the power module from above, and a connection conductor configured to connect an internal power feeding passage on the side of the power module and an external power feeding passage on the side of the motor unit, wherein the connection conductor vertically passes through the support block and includes a connecting fixing section that protrudes upward than the support block and that is connected to the internal power feeding passage by a fastening member, an inclination wall inclined downward toward a side end portion of the upper wall of the upper case is provided on the upper wall of the upper case, and an opening section facing the connecting fixing section of the connection conductor is provided in the inclination wall.

5 Claims, 10 Drawing Sheets

(56) References Cited

U.S. PATENT DOCUMENTS

| | | | | |
|---|---|---|---|---|
| 2009/0183940 | A1* | 7/2009 | Sekine | H02K 11/33 |
| | | | | 180/443 |
| 2009/0272599 | A1* | 11/2009 | Sekine | H02K 7/1166 |
| | | | | 180/443 |
| 2010/0201213 | A1* | 8/2010 | Kataoka | H02K 3/522 |
| | | | | 310/71 |
| 2012/0286605 | A1* | 11/2012 | Miyachi | H02K 11/33 |
| | | | | 310/71 |
| 2013/0099611 | A1* | 4/2013 | Suga | B62D 5/0406 |
| | | | | 310/71 |
| 2020/0274420 | A1* | 8/2020 | Kunii | H02K 5/225 |
| 2020/0274424 | A1* | 8/2020 | Kunii | H02K 11/33 |
| 2020/0321846 | A1* | 10/2020 | Brinkmann | H02K 5/18 |

FOREIGN PATENT DOCUMENTS

| | | |
|---|---|---|
| CN | 103339839 | 10/2013 |
| CN | 103733495 | 4/2014 |
| CN | 104052197 | 9/2014 |
| CN | 104078455 | 10/2014 |
| CN | 107431412 | 12/2017 |
| CN | 108688454 | 10/2018 |
| JP | 2016-139540 | 8/2016 |
| WO | 2015/098512 | 7/2015 |

* cited by examiner

POWER CONTROL UNIT

CROSS-REFERENCE TO RELATED APPLICATION

Priority is claimed on Japanese Patent Application No. 2019-033239, filed Feb. 26, 2019, the content of which is incorporated herein by reference.

BACKGROUND OF THE INVENTION

Field of the Invention

The present invention relates to a power control unit disposed on an upper section of a motor unit.

Description of Related Art

A configuration in which a power control unit is connected to an upper section of a motor unit mounted in a vehicle is known. A power module including a function of an inverter, a boosting converter, or the like, configured to drive a motor and perform regeneration is installed in the power control unit. A power feed connecting module configured to connect power feeding passages of three phases on the side of the motor unit and power feeding passages of three phases on the side of the power module is provided between the motor unit and the power control unit (for example, see Japanese Unexamined Patent Application, First Publication No. 2016-139540).

Such a power feed connecting module has a connection conductor such as a bus bar or the like configured to connect power feeding passages of phases on the side of the motor unit (hereinafter referred to as "external power feeding passages") and power feeding passages of corresponding phases on the side of the power module (hereinafter referred to as "internal power feeding passages"), and a conductor housing formed of a resin and configured to hold the connection conductor. When the conductor housing is fixed to, for example, the side of the motor unit and attaches the power control unit to the motor unit, a part thereof is disposed in a lower case of the power control unit through a through-hole of the lower case. An end portion of the connection conductor held in the conductor housing is connected to the internal power feeding passages in the lower case.

In addition, in the power control unit employing the power feed connecting module, after the power control unit is assembled to the upper section of the motor unit, in order to connect the connecting fixing section of the connection conductor on the side of the upper section to the internal power feeding passage using a fastening member, an opening section for work is formed in a sidewall of a lower case. When the connection conductor is connected to the internal power feeding passage by the fastening member or when the fastening member is removed for maintenance, a tool configured to operate the fastening member is inserted into the lower case through the opening section. Further, the opening section is normally closed by a detachable lid member.

SUMMARY OF THE INVENTION

However, in the power control unit in the related art, an end portion of the power feed connecting module including the connection conductor is disposed in the lower case configured to cover a support block from below. For this reason, when the connecting fixing section of the connection conductor on the side of the upper section is connected to the internal power feeding passage by the fastening member, the fastening member is removed, or the like, the operating tool is likely to interfere with members near a mount or the like on the side of the motor unit, and workability is degraded.

In addition, in the power control unit in the related art, since a position of the fastening member or the connecting fixing section is below the power control unit, direct visual confirmation for maintenance or the like is difficult, and improvement in this point is also desired.

An aspect of the present invention is directed to providing a power control unit capable of improving attachment and detachment workability of a connection conductor with respect to an internal power feeding passage.

A power control unit according to the present invention employs the following configuration in order to solve the above-mentioned problems.

(1) A power control unit according to the present invention is a power control unit disposed on an upper section of a motor unit and in which the motor unit and a power feeding passage are connected to each other, the power control unit including: a power module; a support block disposed below the power module and configured to support the power module; an upper case attached to the support block and configured to cover the power module from above; and a connection conductor configured to connect an internal power feeding passage on a side of the power module and an external power feeding passage on a side of the motor unit, wherein the connection conductor vertically passes through the support block, and includes a connecting fixing section that protrudes upward than the support block and that is connected to the internal power feeding passage by a fastening member, an inclination wall inclined downward toward a side end portion of an upper wall of the upper case is provided on the upper wall of the upper case, and an opening section facing the connecting fixing section of the connection conductor is provided in the inclination wall.

In the power control unit of this configuration, the opening section facing the connecting fixing section of the connection conductor is provided in the inclination wall portion of the upper wall of the upper case while the connection conductor passes through the support block and is disposed in the upper case. For this reason, work of fastening or removing the fastening member can be easily performed without interference with another part such as a mount section or the like near the motor unit. In particular, in the power control unit, since the opening section is provided in the inclination wall portion, the position of the fastening member or the connecting fixing section can be easily and reliably visually checked through the opening section during working without sacrificing manageability of the operating tool.

(2) In the aspect of the above-mentioned (1), the opening section may be formed to have a shape and a size such that the fastening member or the connecting fixing section can be visually checked from a front view perpendicular to the inclination wall.

In this case, a worker can reliably visually check the fastening member or the connecting fixing section by looking into the opening section from the front perpendicular to the inclination wall.

(3) In the aspect of the above-mentioned (1) or (2), a sidewall extending in a direction toward the support block may be continuously provided on a side end portion of the upper wall, and a concave section using the inclination wall as a bottom wall thereof may be formed in a part of a lateral side having a substantially right-angled cross-sectional shape constituted by the upper wall and the sidewall.

In this case, the concave section is provided in the part of the lateral side having a substantially right-angled cross section in the upper case, and the bottom wall of the concave section becomes the inclination wall. For this reason, a capacity of the upper case can be sufficiently secured while the inclination wall in which the opening section is formed is formed in the upper case.

(4) In the aspect of any one of the above-mentioned (1) to (3), in an upper section of a through-hole vertically passing through the support block, a region of the connection conductor below the connecting fixing section may be covered with an insulating cover member that reduces a gap between the through-hole and the connection conductor.

In this case, when fastening or removing work of the fastening member is performed, even though the fastening member drops in a direction of the through-hole, since the gap between the through-hole and the connection conductor is reduced by the insulating cover member, it is possible to prevent the fastening member from further dropping below the support block. Accordingly, this can also improve attachment/detachment workability of the connection conductor.

(5) In the aspect of any one of the above-mentioned (1) to (4), a high voltage cable connected to a circuit inside the upper case may be routed in the upper section of the upper case at a position that bypasses the inclination wall.

In this case, when attachment/detachment work of the connection conductor is performed through the opening section, it is possible to prevent the high voltage cable from obstructing the work or visual observation of a working part.

According to the aspect of the present invention, the connection conductor passes through the support block and is disposed inside the upper case, and the opening section facing the connecting fixing section of the connection conductor is provided in the inclination wall portion of the upper wall of the upper case. For this reason, the attachment/detachment work of the connection conductor can be easily performed by the operating tool while the position of the fastening member or the connecting fixing section is visually checked. Accordingly, according to the aspect of the present invention, attachment/detachment workability of the connection conductor with respect to the internal power feeding passage can be improved.

DETAILED DESCRIPTION OF THE INVENTION

Hereinafter, an embodiment of the present invention will be described with reference to the accompanying drawings. Further, in some of the drawings, an arrow FR indicates a forward direction with respect to a vehicle, an arrow UP indicates an upward direction with respect to the vehicle, and an arrow LH indicates a leftward direction with respect to the vehicle.

Figure 1:
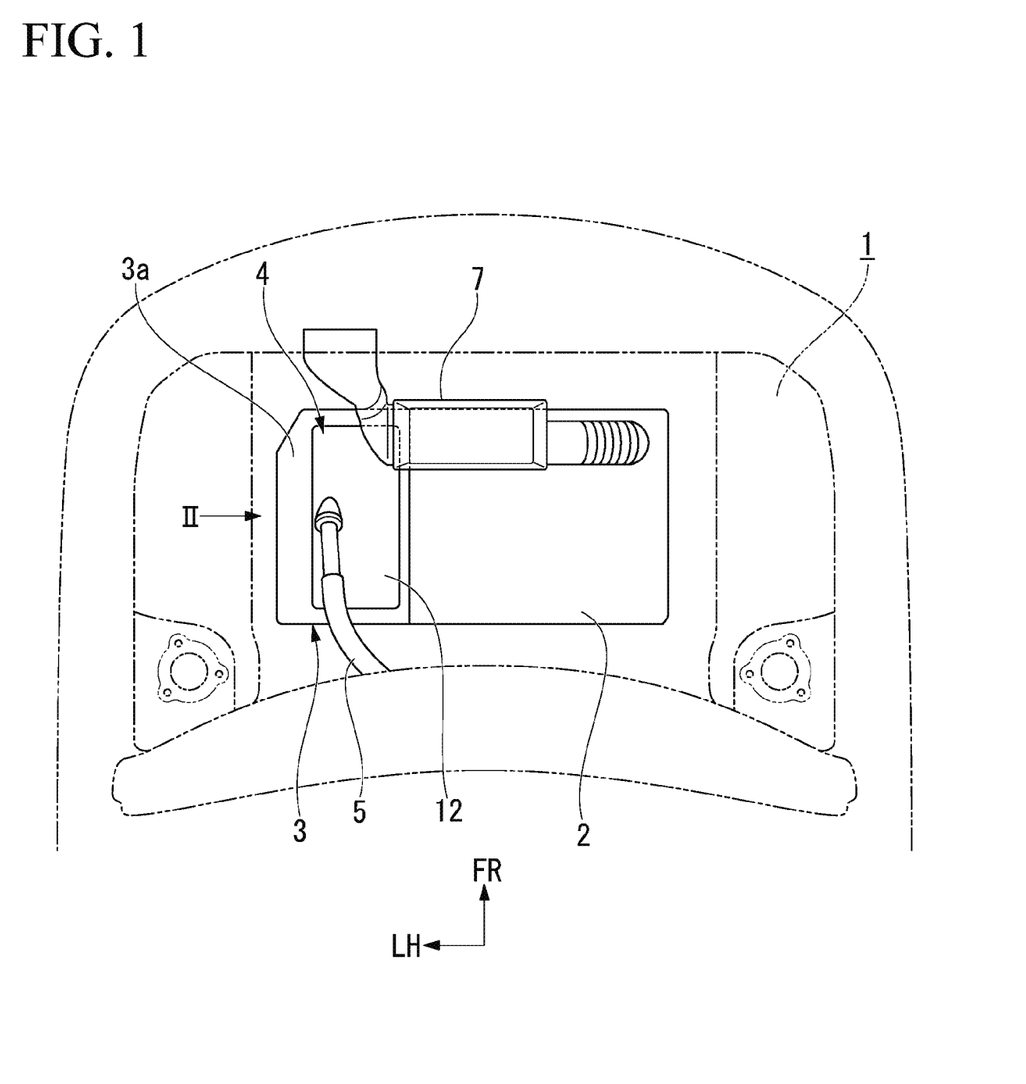
FIG. 1 is a plan view showing disposition of devices in an engine compartment of a vehicle of an embodiment.
Figure 2:
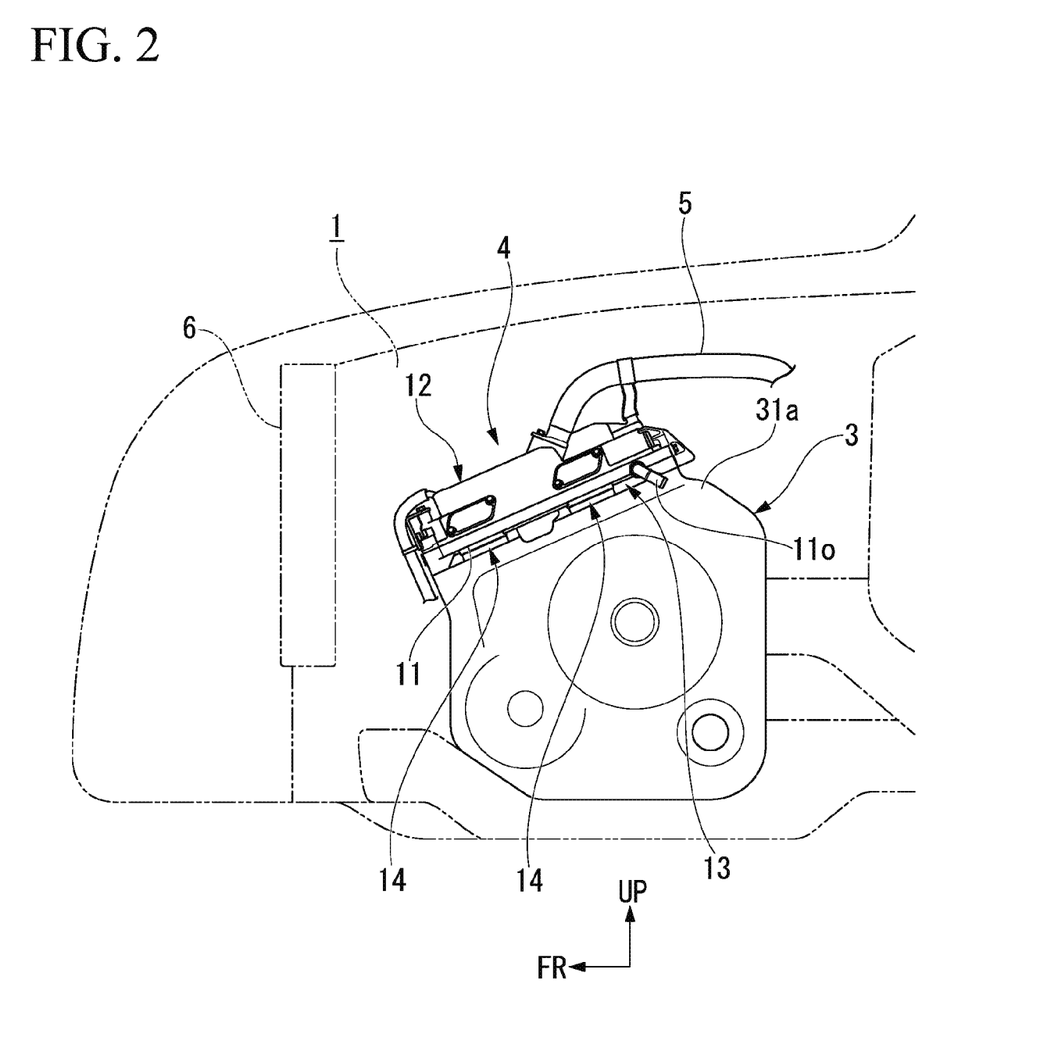
FIG. 2 is a schematic side view of the vehicle of the embodiment corresponding to an arrow II in FIG. 1.

FIG. 1 is a view showing an engine compartment 1 of a vehicle from above, and FIG. 2 is a schematic side view corresponding to an arrow II in FIG. 1.

An engine 2 and a motor unit 3 that are configured to drive the vehicle are mounted in the engine compartment 1 of the vehicle. The motor unit 3 performs driving of the vehicle and regenerative power generation according to traveling circumstances of the vehicle. The motor unit 3 is integrally coupled to a side portion of the engine 2. A power control unit 4 configured to convert electric power of a high voltage battery (not shown) into an alternating current and output the converted alternating current to the motor unit 3, and reversely, output the electric power generated as regenerative power in the motor unit 3 to the high voltage battery is connected to an upper section of the motor unit 3. Further, reference numeral 5 in the drawings designates a high voltage cable configured to connect the high voltage battery (not shown) and the power control unit 4, reference numeral 6 designates a radiator, and reference numeral 7 designates an air cleaner configured to filter external air and introduce the external air into the engine 2.

Figure 3:
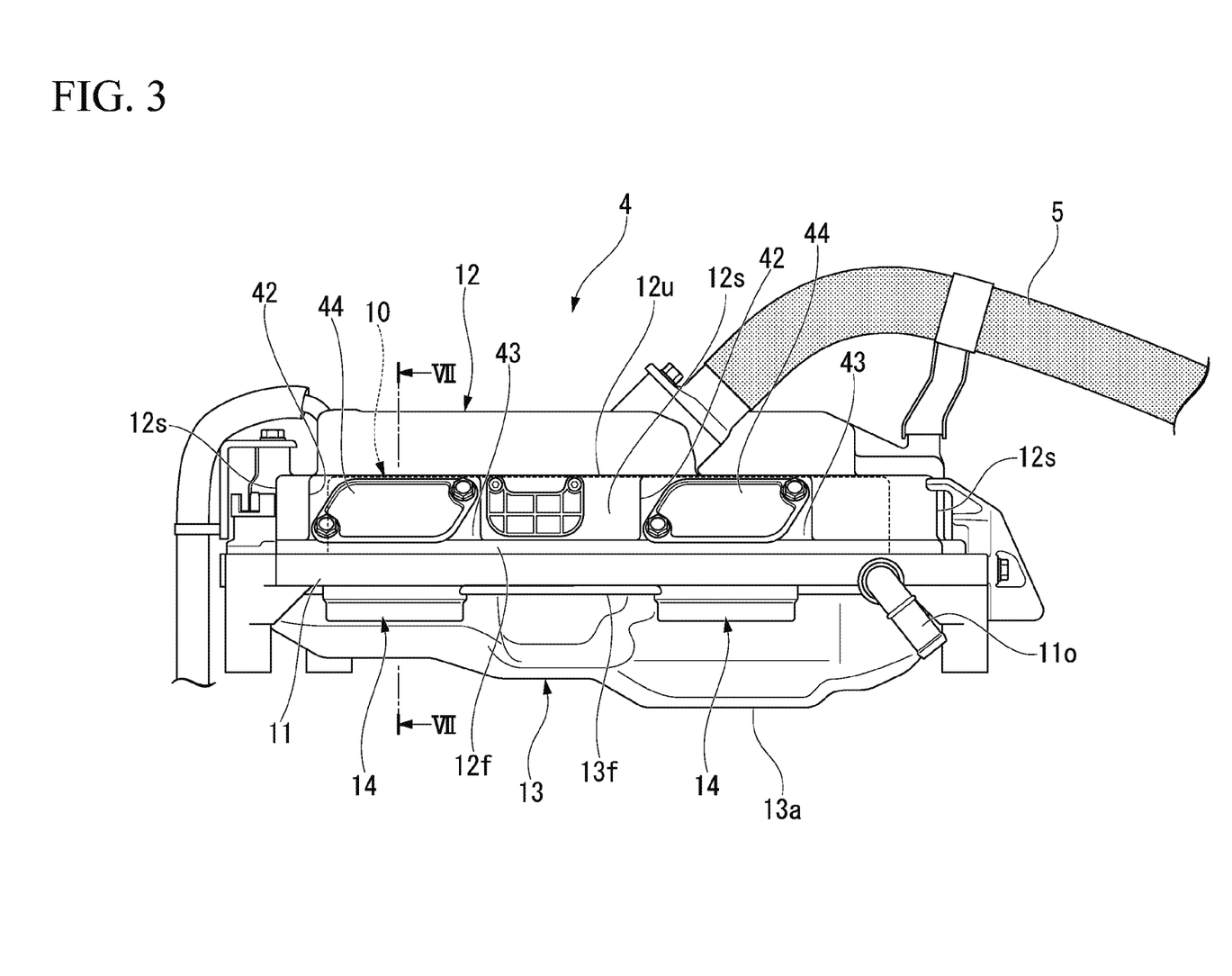
FIG. 3 is a side view of a power control unit of the embodiment.

FIG. 3 is a view showing the power control unit 4 from a leftward side of the vehicle.

The power control unit 4 includes a power module 10 having a function of an inverter, a boosting converter, or the like, a water jacket 11 disposed below the power module 10 and configured to support the power module 10, an upper case 12 attached to an upper surface side of the water jacket 11 and configured to cover the top and periphery of the power module 10, and a lower case 13 attached to a lower surface side of the water jacket 11 and configured to cover a reactor or the like (not shown) disposed below the water jacket 11.

The power module 10 receives a control signal from a control device (not shown), converts a direct current of the high voltage battery into a three-phase alternating current and outputs the alternating current to a motor main body section of the motor unit 3, and converts the three-phase alternating current generated by the motor main body section into a direct current and outputs the converted direct current to the high voltage battery during regenerative power generation. The power module 10 and the motor unit 3 are electrically connected by two power feed connecting modules 14 (power feed joints). The two power feed connecting modules 14 are a power feed connecting module configured to drive a motor and a power feed connecting module for regeneration. The two power feed connecting modules 14 have the same configuration.

The two power feed connecting modules 14 are attached to an upper section of a motor block 3a (a fixed block) of the motor unit 3 and separated from each other in a vehicle forward/rearward direction. The power feed connecting modules 14 are detachably attached to the upper section of the motor block 3a.

The water jacket 11 is formed of a metal material having good thermal conductivity, and cools mounted devices as cooling water circulates therethrough. An introduction port 11*i* and a discharge port 11*o* (see FIG. 9) for cooling water are provided in the water jacket 11. The introduction port 11*i* and the discharge port 11*o* are connected to a cooling water circulation circuit (not shown).

In addition, the power module 10 is attached to an upper surface side of the water jacket 11 via a module holding member 17. In the embodiment, the module holding member 17 and the water jacket 11 constitute a support block configured to support the power module 10 at a lower side of the power module 10.

The upper case 12 has major parts that are integrally formed of an aluminum alloy, a heat-resisting resin, or the like. The upper case 12 has an upper wall 12*u* configured to mainly cover the power module 10 from above, sidewalls 12*s* extending to be bent from front, rear, left and right end portions of the upper wall 12*u* in a direction of the water jacket 11, and circumferential edge flanges 12*f* overhanging outward from lower ends of the sidewalls 12*s*. The circumferential edge flanges 12*f* overlap the upper surface of the water jacket 11, and are fastened to a circumferential edge portion of the water jacket 11 by bolts.

The lower case 13 is integrally formed of a metal plate member. The lower case 13 has a circumferential edge flange 13*f* (see FIG. 7) fastened to a lower surface of the water jacket 11 by bolts, and a swelling section 13*a* swelling downward from the circumferential edge flange 13*f*. The swelling section 13*a* covers outer sides of accommodated parts such as a reactor and the like (not shown) attached to the lower surface side of the water jacket 11.

Figure 4:
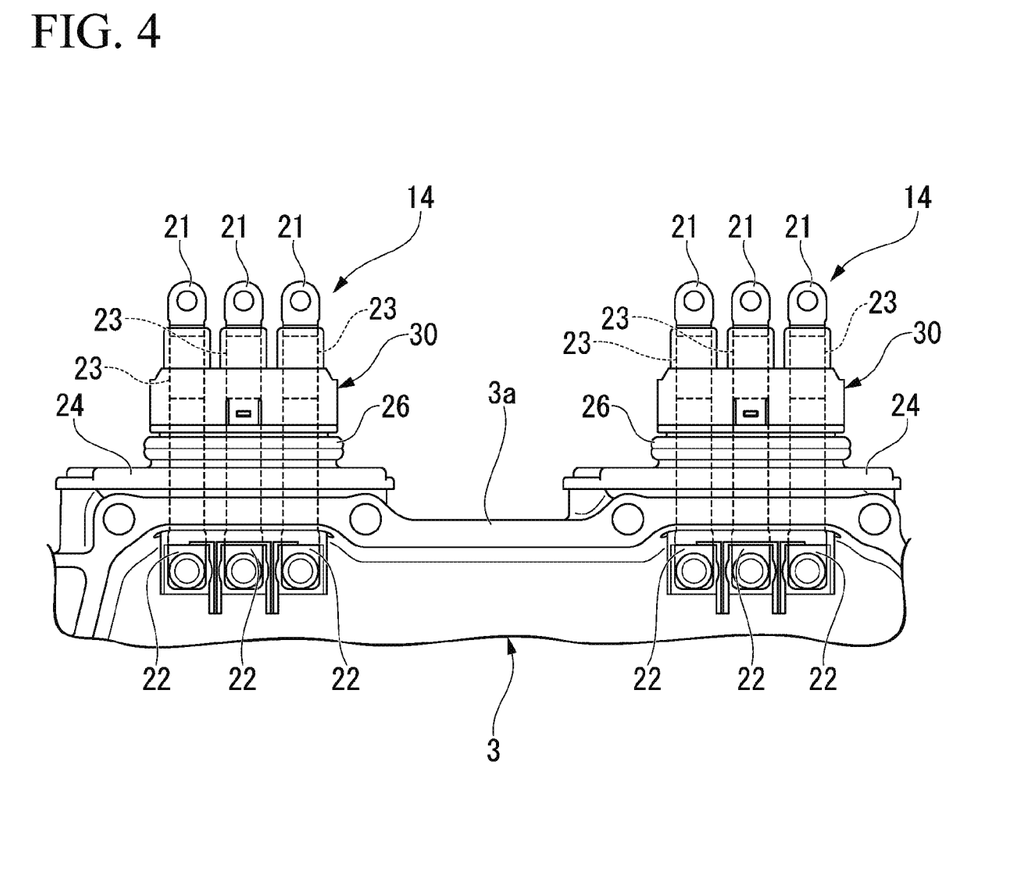
FIG. 4 is a side view of an upper section of a motor unit of the embodiment.
Figure 5:
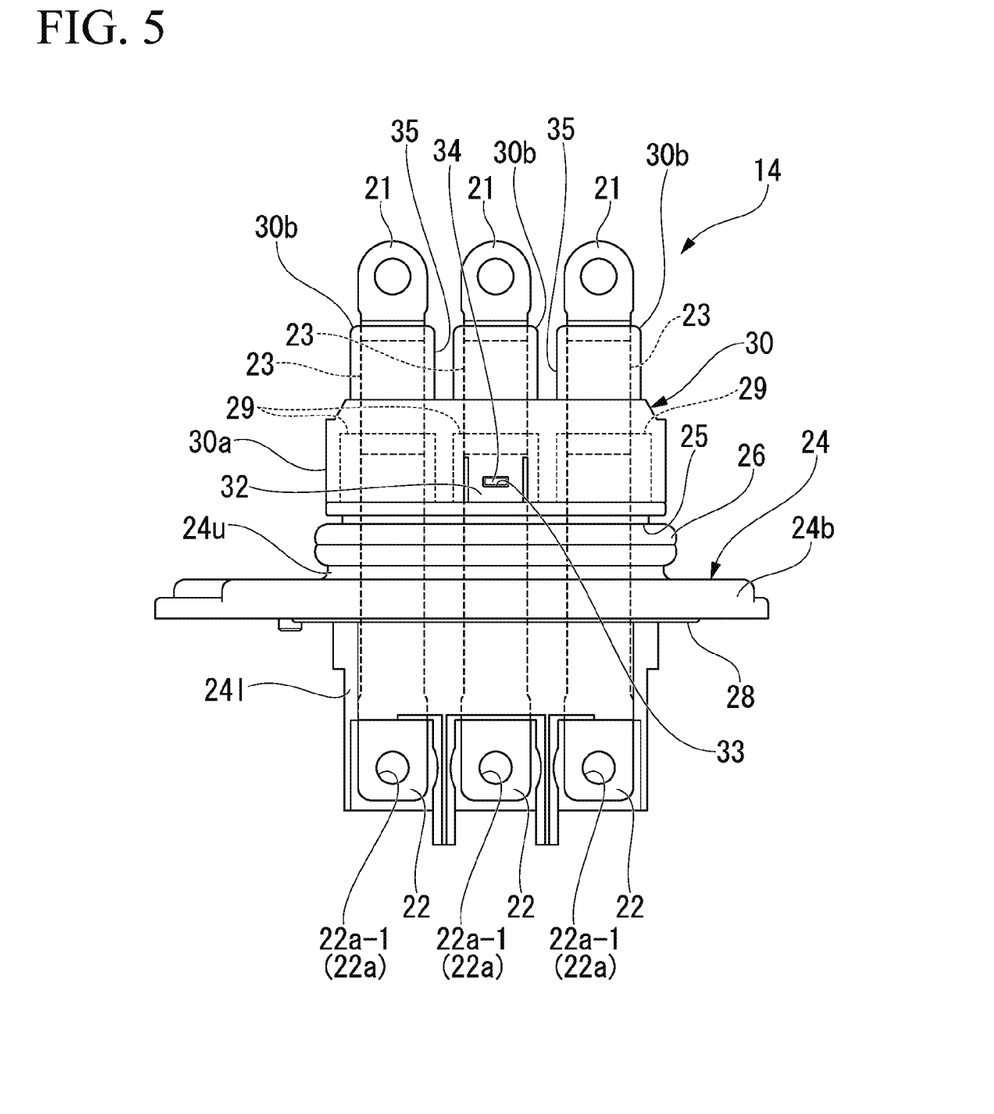
FIG. 5 is a front view of a power feed connecting module of the embodiment.
Figure 6:
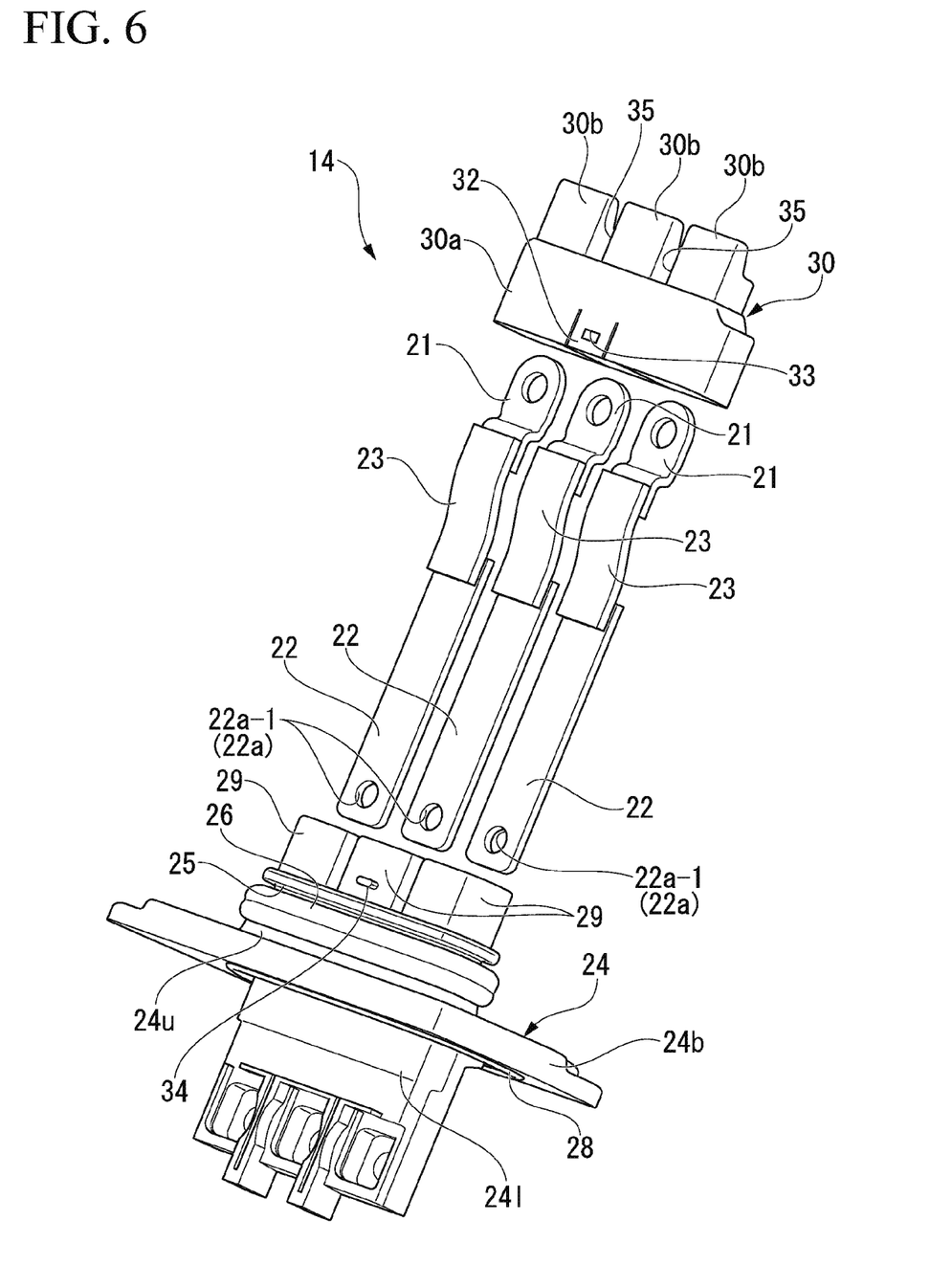
FIG. 6 is an exploded perspective view of the power feed connecting module of the embodiment.
Figure 7:
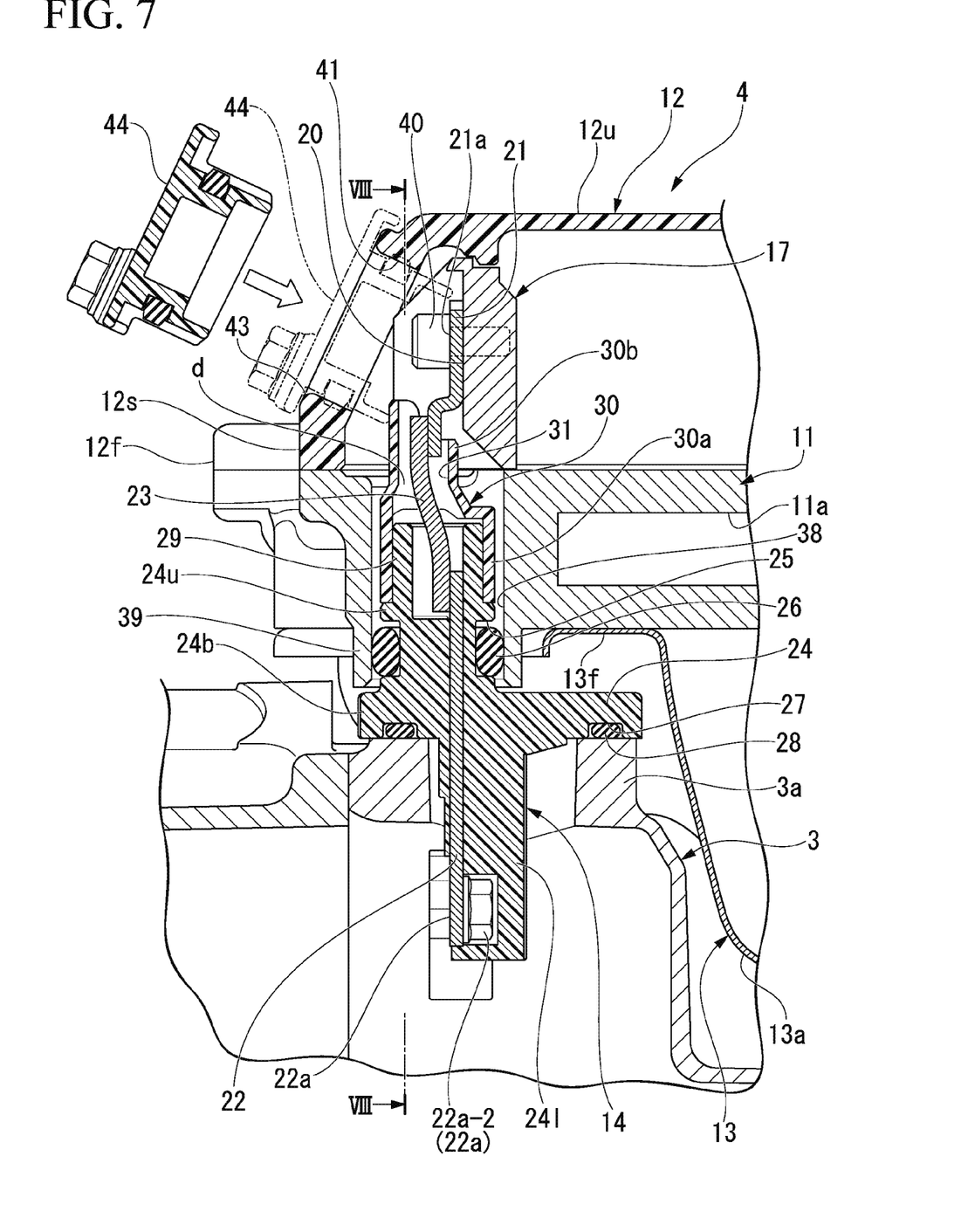
FIG. 7 is a cross-sectional view of the power control unit of the embodiment along line VII-VII in FIG. 3.
Figure 8:
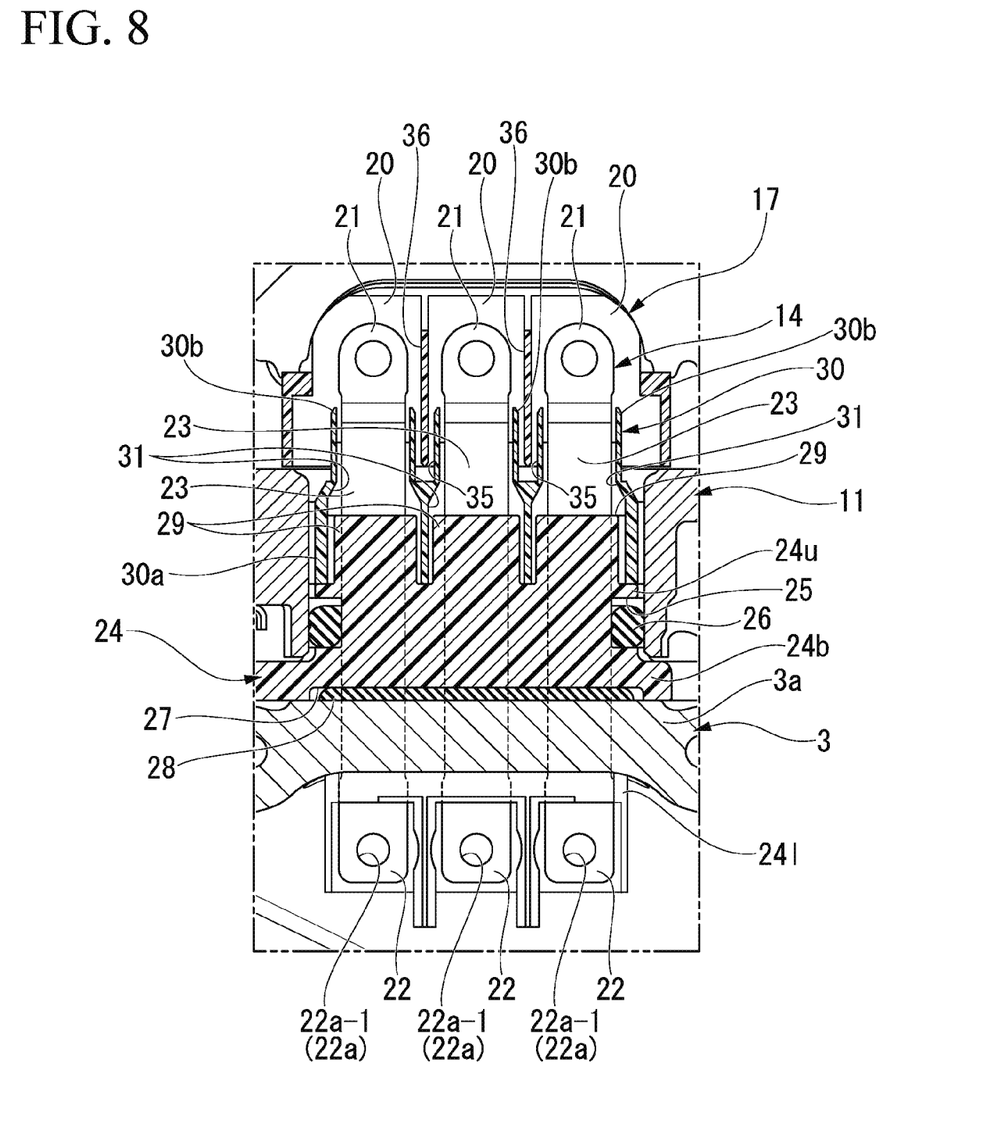
FIG. 8 is a cross-sectional view of the power control unit of the embodiment along line VIII-VIII in FIG. 7.

FIG. 4 is a view showing a state in which the two power feed connecting modules 14 are attached to the upper section of the motor block 3*a*. FIG. 5 is a front view of the power feed connecting modules 14, and FIG. 6 is an exploded perspective view of the power feed connecting modules 14. In addition, FIG. 7 is a cross-sectional view along line VII-VII in FIG. 3, and FIG. 8 is a cross-sectional view along line VIII-VIII in FIG. 7. Further, the two power feed connecting modules 14 are connected to the inside of the power control unit 4 substantially similarly. In addition, a structure of a joint in the power control unit 4 corresponding to each of the power feed connecting modules 14 is also similar thereto.

As shown in FIG. 7 and FIG. 8, internal power feeding passages 20 connected to each of the power feed connecting modules 14 are provided in the module holding member 17 that holds the power module 10. Three internal power feeding passages 20 are provided to correspond to each of the power feed connecting modules 14. In addition, three external power feeding passages (not shown) are also provided to correspond to each of the power feed connecting modules 14 similarly on the side of the motor block 3*a* of the motor unit 3.

As shown in FIG. 4 and FIG. 5, each of the power feed connecting modules 14 includes three module-side bus bars 21 connected to the internal power feeding passages 20 on the side of the power module 10, three motor-side bus bars 22 connected to an external power feeding passage on the side of the motor unit 3, three braided wires 23 configured to connect the module-side bus bars 21 and the motor-side bus bars 22, which have corresponding phases, and a bus bar housing 24 (a conductive housing) formed of an insulating resin and configured to hold the three motor-side bus bars 22.

The module-side bus bars 21 and the motor-side bus bars 22 are formed of a conductive metal plate having a predetermined thickness.

The braided wires 23 are constituted by braided wires obtained by, for example, braiding a plurality of copper wires. The braided wires 23 enable the module-side bus bars 21 and the motor-side bus bars 22 to be easily deformable in various directions.

In the embodiment, three of the module-side bus bars 21, the braided wires 23 and the motor-side bus bars 22 constitute a connection conductor configured to connect the internal power feeding passages 20 on the side of the power module 10 and the external power feeding passage on the side of the motor unit 3.

As shown in FIG. 5 and FIG. 6, the bus bar housing 24 has a plate-shaped base wall 24*b* overlapping and fastened to an upper surface (see FIG. 4) of the motor block 3*a* by bolts, a downward protruding section 241 protruding downward from the base wall 24*b*, and an upward protruding section 24*u* (a protruding section) protruding upward from the base wall 24*b*. The three motor-side bus bars 22 are held on the downward protruding section 241, the base wall 24*b* and the upward protruding section 24*u* and are separated from each other. The three motor-side bus bars 22 are held in the bus bar housing 24 such that a lengthwise direction is aligned with an upward/downward direction and they are aligned side by side in a row. In addition, lower end portions of the motor-side bus bars 22 are exposed to the outside from a side surface of the downward protruding section 241 close to a lower end thereof. Connecting fixing sections 22*a* fastened to the external power feeding passage in the motor unit 3 by bolts are provided on the lower end portions of the motor-side bus bars 22. In the embodiment, the connecting fixing section is constituted by a bolt insertion hole 22*a*-1 and a weld nut 22*a*-2.

An annular holding groove 25 having a vertical width larger than a dimension in a depth direction is formed in an outer circumferential surface of the upward protruding section 24*u* of the bus bar housing 24 on a base end side. A seal ring 26 (a seal member) having a substantially elliptical shape with a vertically elongated cross section is mounted in the holding groove 25. The seal ring 26 seals a gap with the water jacket 11 as will be described below. In addition, an annular groove 27 is formed in a lower surface of the base wall 24*b*, and a seal ring 28 configured to seal between the lower surface of the base wall 24*b* and the upper surface of the motor block 3*a* is mounted in the annular groove 27.

Three tubular sections 29 configured to independently cover the peripheries of upper end sides of the three motor-side bus bars 22 protrude on an upper end side of the upward protruding section 24*u* of the bus bar housing 24. An integrated insulating cover member 30 formed of an insulating resin material is detachably attached to the three tubular sections 29. Further, the insulating cover member 30 constitutes the power feed connecting modules 14 together with the module-side bus bars 21, the motor-side bus bars 22, the braided wires 23, the bus bar housing 24, and the like.

The insulating cover member 30 includes lower blocks 30*a* fitted into the three tubular sections 29 of the bus bar housing 24 from above, and three cylinder sections 30*b* protruding upward from upper sections of the lower blocks 30*a*. Continuous insertion holes 31 that pass in the upward/downward direction are formed in the lower blocks 30*a* and the cylinder sections 30*b*. Lower ends of the insertion holes 31 disposed in the lower blocks 30*a* are fitted into the tubular sections 29 of the bus bar housing 24. The braided wires 23 having corresponding phases and parts of the module-side bus bars 21 on the lower section side are disposed in the cylinder sections 30b and inserted therethrough.

As shown in FIG. 7, when the insulating cover member 30 is assembled to the upper section of the bus bar housing 24, surroundings of joints of the upper sections of the motor-side bus bars 22 of the phases and the braided wires 23 are directly covered with the tubular sections 29 of the bus bar housing 24. In addition, at this time, surroundings of the joints of the braided wires 23 of each phases and the lower sections of the module-side bus bars 21 are directly covered with circumferential walls of the corresponding insertion holes 31 of the insulating cover member 30. Accordingly, the lower section sides of the braided wires 23 are covered with the insulating cover member 30 with the tubular sections 29 of the bus bar housing 24 sandwiched therebetween, and the upper section sides of the braided wires 23 are directly covered with the insulating cover member 30. As shown in FIG. 7, the insulating cover member 30 and the tubular sections 29 surround peripheries of the braided wires 23 or the module-side bus bars 21 with a gap d.

Further, in the embodiment, walls of the cylinder sections 30b of the insulating cover member 30 constitute partition walls that partition the adjacent braided wires 23.

The cylinder sections 30b of the insulating cover member 30 attached to the bus bar housing 24 have upper end portions that extend to positions facing at least parts of the module-side bus bars 21. For this reason, the insulating cover member 30 can reliably restrict falling of the module-side bus bars 21 due to deformation of the braided wires 23 using the cylinder sections 30b.

However, the insulating cover member 30 can restrict falling of the module-side bus bars 21 to somewhat extent as long as it is a structure that surrounds peripheries of the braided wires 23 even at heights that do not reach positions facing the module-side bus bars 21.

In addition, as shown in FIG. 6 or the like, tongues 32 that are flexibly deformable by notches are formed on walls of lower edges of the lower blocks 30a of the insulating cover member 30. Locking holes 33 are formed in the tongues 32 to pass therethrough in a plate thickness direction. On the other hand, protrusions 34 that can be fitted into the locking holes 33 are provided on outer surfaces of the tubular sections 29 of the bus bar housing 24. The protrusions 34 bend the tongues 32 and are fitted into the locking holes 33 when the insulating cover member 30 is fitted into the tubular sections 29 of the bus bar housing 24. Accordingly, the insulating cover member 30 is retained in the bus bar housing 24.

In addition, as shown in FIG. 5 and FIG. 8, the insulating cover member 30 of the embodiment forms a concave section 35 in which upper surfaces of the neighboring cylinder sections 30b and the lower blocks 30a are open upward.

The concave section 35 is configured to separate the enclosing sections of the neighboring module-side bus bars 21 and to which a displacement restricting section 36 protruding from the module holding member 17 is inserted therein when the power feed connecting modules 14 are assembled to the power control unit 4. The displacement restricting section 36 restricts displacement of the insulating cover member 30 by being inserted into the concave section 35 of the insulating cover member 30.

Figure 9:
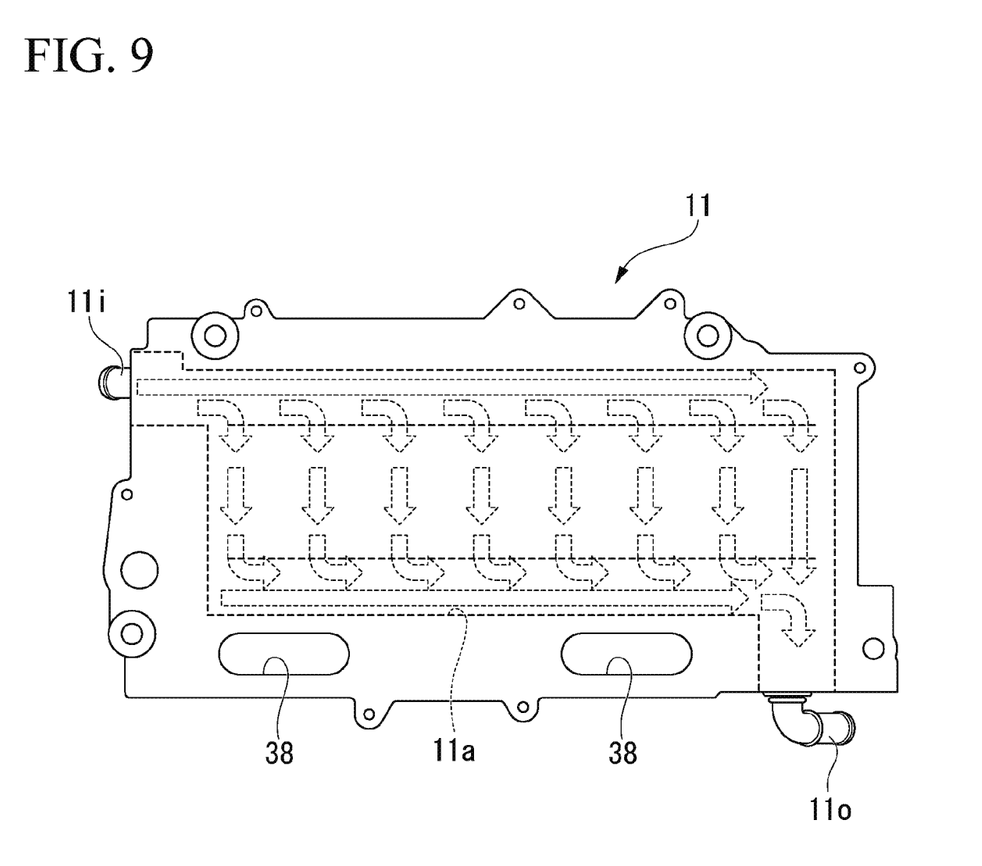
FIG. 9 is a plan view of a water jacket of the embodiment.

FIG. 9 is a view showing the water jacket 11 from above.

The water jacket 11 is formed in a substantially rectangular shape when seen in a plan view, the introduction port 11i for the cooling water is disposed in a front surface close to one end in a lengthwise direction, and the discharge port 11o for the cooling water is disposed in a side surface close to the other end in the lengthwise direction. A cooling passage 11a through which the cooling water flows toward the discharge port 11o from the introduction port 11i is formed in the water jacket 11. A pair of through-holes 38 passing through the water jacket 11 from an upward side to a downward side are formed at positions close to the cooling passage 11a of one side portion of the water jacket 11. The through-holes 38 are formed in elongated hole shapes in a lengthwise direction of the water jacket 11.

In addition, as shown in FIG. 7, tubular walls 39 protruding downward protrude from lower edge portions of the through-holes 38 of the water jacket 11. Inner circumferential surfaces of the tubular walls 39 are continuous with the through-holes 38. Parts of the power feed connecting modules 14 are inserted into the tubular walls 39 and the through-holes 38 from below. Specifically, a portion of the bus bar housing 24 above the base wall 24b, the insulating cover member 30 assembled to the bus bar housing 24, and upper regions of the three-phase connection conductors (the module-side bus bars 21, the braided wires 23 and the motor-side bus bars 22) held therein are inserted into the tubular walls 39 and the through-holes 38. Here, the seal ring 26 attached to the upward protruding section 24u of the bus bar housing 24 becomes in close contact with the inner circumferential surfaces of the tubular walls 39 while being elastically deformed. The seal ring 26 abuts the inner circumferential surfaces of the tubular walls 39 and the inner wall of the holding groove 25 of the upward protruding section 24u and closes a space therebetween. As a result, surroundings of the water jacket 11 below the through-holes 38 are closed by the seal ring 26. The seal ring 26 transfers heat toward a main body section of the water jacket 11 through the tubular walls 39. For this reason, the heat transmitted to the seal ring 26 from the three-phase connection conductor is radiated to the water jacket 11.

Further, the base wall 24b of the bus bar housing 24 is fixed to the lower surface of the water jacket 11 through bolt fastening or the like. In addition, the braided wires 23 having the phases are disposed on portions inside the through-holes 38.

As described above, when the parts of the power feed connecting modules 14 are inserted into the tubular walls 39 and the through-holes 38, falling of the module-side bus bars 21 due to bending of the braided wires 23 is restricted by the insulating cover member 30. In addition, as described above, when the power feed connecting modules 14 are assembled to the water jacket 11, connecting fixing sections 21a of upper ends of the module-side bus bars 21 of the power feed connecting modules 14 are disposed at positions facing the internal power feeding passages 20 corresponding to the module holding member 17. As shown in FIG. 7, the connecting fixing sections 21a of the module-side bus bars 21 are connected to the corresponding internal power feeding passages 20 through fastening using bolts 40. Fastening of the connecting fixing sections 21a by the bolts 40 (fastening members) is performed by an operating tool through opening sections 41 provided in the upper case 12. The opening sections 41 are disposed at positions in the upper case 12 facing the connecting fixing sections 21a of the module-side bus bars 21 from diagonally above the side portions.

Figure 10:
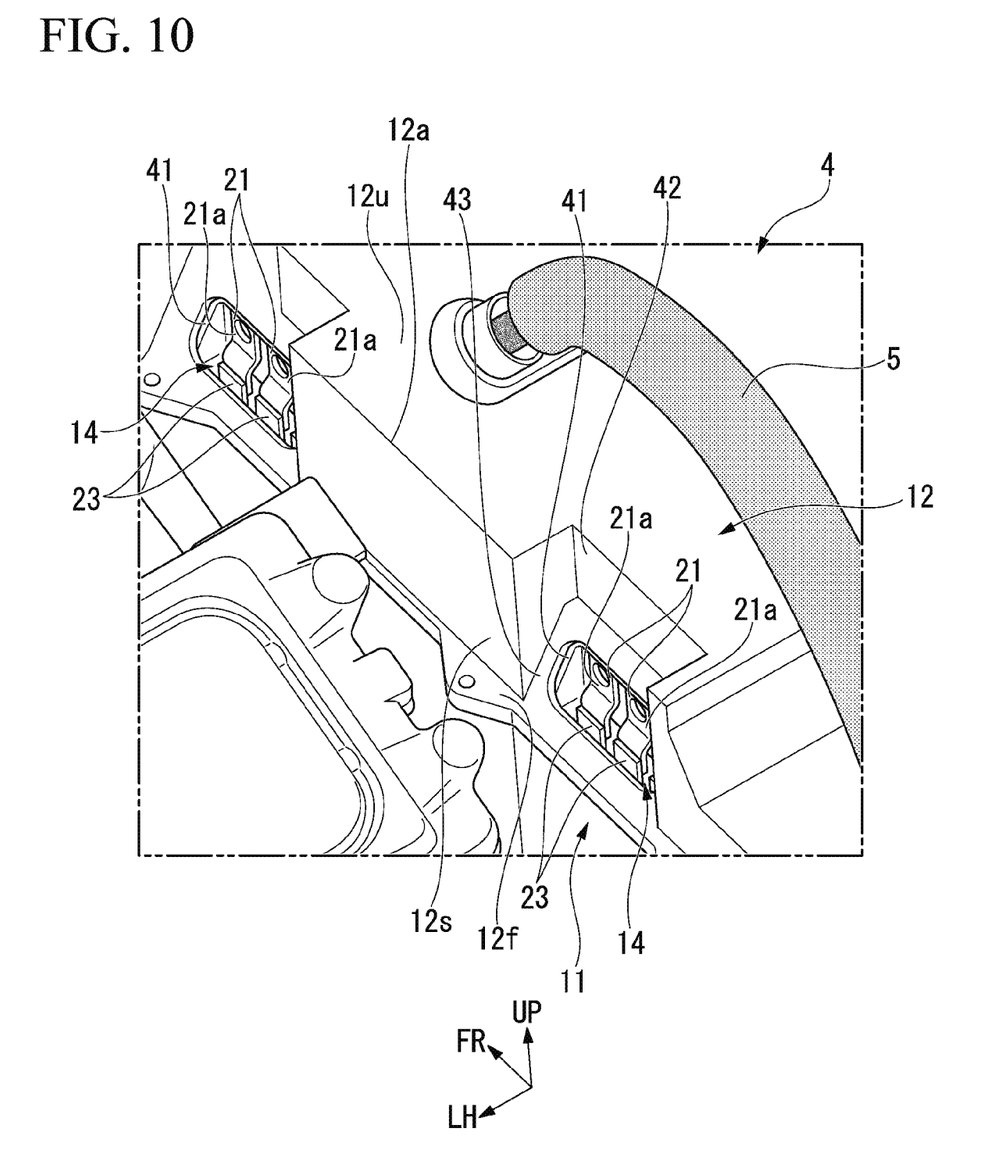
FIG. 10 is a perspective view of the power control unit of the embodiment in the engine compartment.

FIG. 10 is a view showing the power control unit 4 disposed in the engine compartment 1 from diagonally above and to the left of a rear section thereof.

As shown in FIG. 10, two concave sections 42 are formed in lateral side 12a of the upper case 12, which is sandwiched between the upper wall 12u and the sidewall 12s (the sidewall facing outward in the vehicle width direction) of the upper case 12 and which has a substantially perpendicular cross-sectional shape, such that corner sections of the lateral sides 12a are cut out. Bottom walls of the concave sections 42 are constituted by inclination walls 43 inclined downward from a central side of the upper wall 12u in a direction of the sidewalls 12s. The opening sections 41 used upon fastening or the like of the connecting fixing sections 21a are formed in the inclination walls 43. The inclination walls 43 are formed at positions facing the connecting fixing sections 21a from diagonally above the side portions thereof.

The opening sections 41 are formed to have a shape and a size such that head sections of the bolts 40 that are fastening members or the connecting fixing sections 21a are visually recognizable when seen in a front view perpendicular to the inclination walls 43. In addition, since the opening sections 41 are provided to perform an attachment/detachment operation of the bolts 40 that are fastening members, the opening sections 41 are formed to have a size such that the bolts 40 or a tip portion of the operating tool can be inserted thereinto.

In addition, as shown in FIG. 7, since the through-holes 38 of the water jacket 11 are disposed below the opening sections 41 of the upper case 12, falling of the bolts 40 from the through-holes 38 upon attachment/detachment of the bolts 40 needs to be avoided. In the embodiment, since the insulating cover member 30 are disposed to fill gaps between the through-holes 38 and the connection conductor (the module-side bus bar 21 or the braided wires 23), dropping of the bolts 40 from the through-holes 38 can be prevented.

In addition, as shown in FIG. 7, the opening sections 41 provided in the inclination walls 43 are normally closed by a lid member 44. The lid member 44 is detachably attached to the corresponding inclination wall 43 by a screw clamp or the like, and removed from the inclination wall 43 upon necessity such as maintenance or the like.

In addition, as shown in FIG. 10, a high voltage cable 5 connected to a high voltage circuit including a capacitor in the upper case 12 is extracted from the upper section of the upper case 12. The high voltage cable 5 is routed at positions that avoid the inclination walls 43 on the upper wall 12u of the upper case 12.

As described above, in the power control unit 4 of the embodiment, the module-side bus bars 21 (the connection conductors) of the power feed connecting modules 14 pass through the water jacket 11 serving as a support block and is disposed in the upper case 12, and the opening section 41 for works is provided in a portion of the inclination wall 43 of the upper wall 12u of the upper case 12. For this reason, in the power control unit 4 of the embodiment, upon an attachment/detachment work of the connecting fixing section 21a, the work can be easily performed by the operating tool while visually checking a position of a head section of the bolt 40 or the connecting fixing section 21a through the opening section 41 that opens diagonally upward from a side portion thereof.

In addition, in the power control unit 4 of the embodiment, the opening section 41 of the upper case 12 is formed to have a shape and a size such that the head section of the bolt 40 or the connecting fixing section 21a can be visually checked when seen in a front view perpendicular to the inclination wall 43. For this reason, a worker can reliably visually check the head section of the bolt 40 or the connecting fixing section 21a by looking into the opening section 41 from the front perpendicular to the inclination wall 43.

In addition, in the power control unit 4 of the embodiment, the concave section 42 using the inclination wall 43 as a bottom wall is formed in a part of the almost-right-angled lateral side 12a constituted by the upper wall 12u and the sidewall 12s of the upper wall 12u of the upper case 12. An internal capacity of the upper case 12 can be sufficiently largely secured while forming the inclination wall 43 configured to provide the opening section 41 in the upper case 12.

In addition, in the power control unit 4 of the embodiment, the insulating cover member 30 is provided in the upper section of the through-hole 38 of the water jacket 11 to reduce a space between the through-hole 38 and the connection conductors (the module-side bus bars 21 or the braided wires 23) of the power feed connecting modules 14.

For this reason, upon fastening or removal of the bolt 40, it is possible to prevent the bolt 40 from dropping down through the gap between the through-hole 38 and the connection conductor.

Further, in the power control unit 4 of the embodiment, since the high voltage cable 5 is routed above the upper case 12 such that the high voltage cable 5 extracted from the upper case 12 bypasses the inclination wall 43, when an attachment/detachment work of the bolt 40 is performed through the opening section 41, it is possible to prevent the high voltage cable 5 from obstructing visual observation of a working part or a work.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A power control unit disposed on an upper section of a motor unit and in which the motor unit and a power feeding passage are connected to each other, the power control unit comprising:
   a power module;
   a support block disposed below the power module and configured to support the power module;
   an upper case attached to the support block and configured to cover the power module from above; and
   a connection conductor configured to connect an internal power feeding passage on a side of the power module and an external power feeding passage on a side of the motor unit,
   wherein the connection conductor vertically passes through the support block, and includes a connecting fixing section that protrudes upward than the support block and that is connected to the internal power feeding passage by a fastening member,
   an inclination wall inclined downward toward a side end portion of an upper wall of the upper case is provided on the upper wall of the upper case, and
   an opening section facing the connecting fixing section of the connection conductor is provided in the inclination wall.

2. The power control unit according to claim 1, wherein the opening section is formed to have a shape and a size such that the fastening member or the connecting fixing section can be visually checked from a front view perpendicular to the inclination wall.

3. The power control unit according to claim 1, wherein a sidewall extending in a direction toward the support block is continuously provided on a side end portion of the upper wall, and
a concave section using the inclination wall as a bottom wall thereof is formed in a part of a lateral side having a substantially right-angled cross-sectional shape constituted by the upper wall and the sidewall.

4. The power control unit according to claim 1, wherein, in an upper section of a through-hole vertically passing through the support block, a region of the connection conductor below the connecting fixing section is covered with an insulating cover member that reduces a gap between the through-hole and the connection conductor.

5. The power control unit according to claim 1, wherein a high voltage cable connected to a circuit inside the upper case is routed in the upper section of the upper case at a position that bypasses the inclination wall.

* * * * *